June 17, 1941. V. E. HAMPSON-TINDALE 2,246,437
THERMOSTAT
Filed Feb. 27, 1939
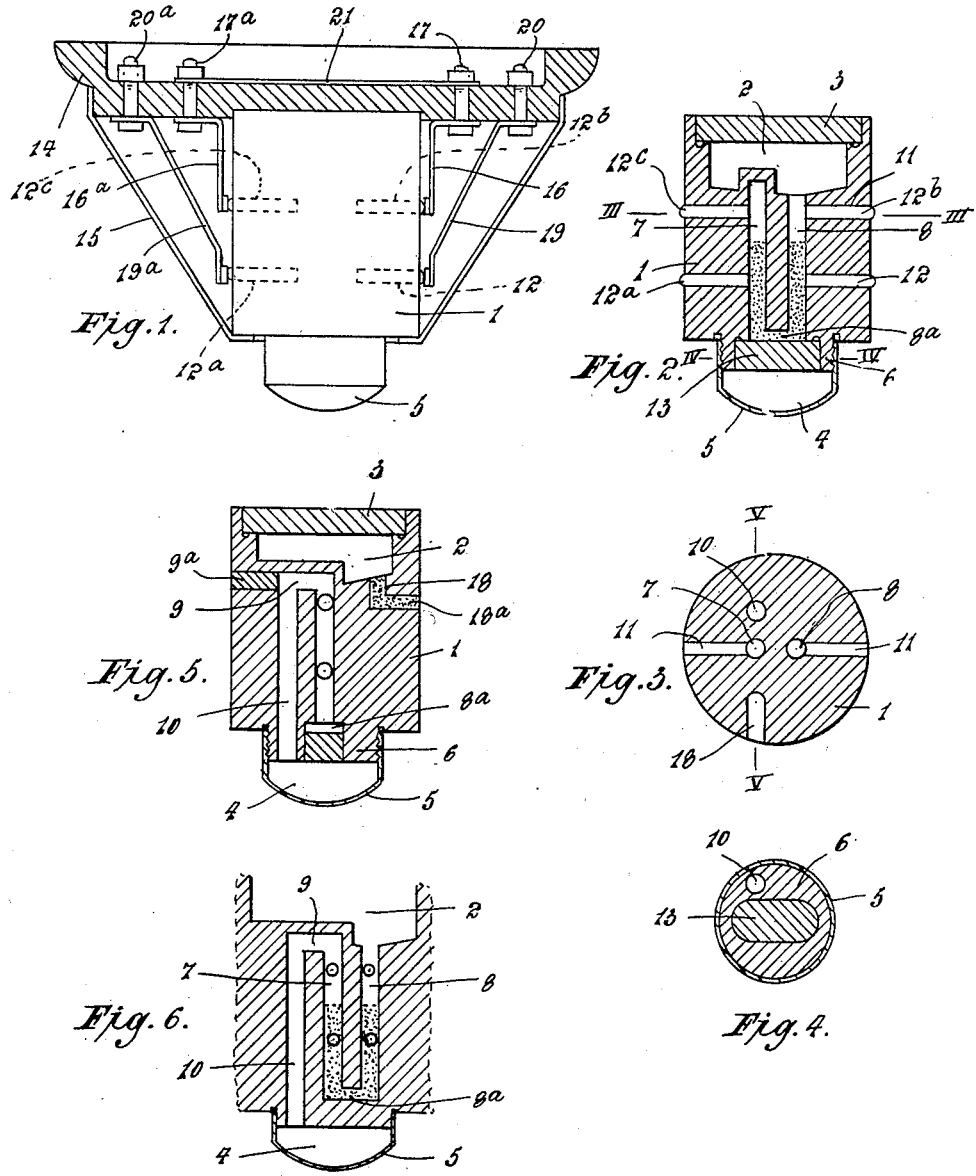
Inventor,
V. E. Hampson-Tindale
by Glascock Downing & Seebold
Attys Patented June 17, 1941

2,246,437

UNITED STATES PATENT OFFICE 2,246,437

THERMOSTAT

Vere Edward Hampson-Tindale, Wellington, New Zealand

Application February 27, 1939, Serial No. 258,836
In New Zealand April 1, 1938

2 Claims. (Cl. 200—140)

This invention relates to thermostats for fire alarms and other heat indicating devices, and particularly relates to the type of thermostat in which two air chambers are employed connected by a passage for mercury open at its ends to the chambers, and having contacts therein so that electrical circuits may be opened or closed by the movement of mercury due to increased pressure in one of the chambers when an increase of temperature takes place in the vicinity of the thermostat.

The object of the invention is to provide a thermostat which will be sensitive to a sudden rise in temperature but which will be compensatory, that is, upon a slow rise of temperature, the thermostat will not operate unless the rise of temperature reaches a predetermined degree, in which case the thermostat will operate.

According to the present invention, one of the chambers is readily sensitive to heat so that expansion of air therein readily takes place on a comparatively quick rise of temperature in the vicinity of the thermostat and moves the mercury in the passage, while the other chamber is less sensitive to heat so that expansion of air therein is comparatively slower than in the first chamber in order that in the case of a slow rise of temperature the air therein will expand equally with the air in the first chamber.

Each of these two chambers has a passage or duct leading to or forming part of a container of electrical insulating material and having mercury therein. The mercury container has contacts in which electrical circuits are connected so that upon the expansion of the air in the sensitive chamber the mercury moves in the container and opens or closes electrical circuits. One of the chambers may have a passage leading to the exterior and be closed by a fusible material.

Should the readily sensitive chamber be defective so that expansion of the air therein is not available to the mercury, then when the heat is sufficient to raise the temperature within the main chamber, the mercury will move in the reserve direction in the container and perform the same function.

Upon the temperature in the vicinity of the thermostat gradually rising, as on a hot day, the air in both chambers will expand and the circuits will not be affected, but should the temperature rise beyond a predetermined degree then the fusible material will melt and the equilibrium of pressure between the chambers will be destroyed and the thermostat will function.

The invention will now be described with the aid of the accompanying drawing, wherein—

Figure 1 is a view showing a thermostat in position on a ceiling.

Figure 2 is a sectional elevation of the thermostat without the contacts and exterior fittings.

Figure 3 is a sectional plan on line III—III of Figure 2.

Figure 4 is a sectional plan on line IV—IV of Figure 2.

Figure 5 is a sectional elevation, the cut being taken along line V—V of Figure 3.

Figure 6 is a diagrammatical form to show how the passages are connected.

Referring to the drawing, the walls of the thermostat consist of a block 1 of electrical insulating material which is inert to mercury, preferably "Bakelite," a chamber 2 being formed at the upper end and sealed by a cover 3 of similar material. The walls of this chamber being of the material mentioned and of a considerable thickness, the chamber will not readily be sensitive to heat but will become heated upon a slow rise of temperature in order to provide the necessary compensation. Another chamber 4 is formed on the under side of the block 1 by means of a dome-shaped metal plate or cap 5 threaded on to a projection 6 from the block, the joint being sealed against the entry of air. The wall of the dome is thin so as to render the chamber readily sensitive to heat.

The U shaped passage for mercury is formed in the block and consists of passages 7 and 8 joined at their lower end, the top end of the passage 8 being open to the chamber 2, while the upper part of the passage 7 is connected by a passage 9 to a vertical passage 10 leading down to the sensitive chamber 4. The passages 7 and 8 may be bored in the block or moulded therewith and open to the lower end thereof, while a channel portion between them at 8a is cut away and the lower end of the passage separated from the chamber 4 by a block 13, thus leaving the connecting passage at 8a. Holes 11 are bored through the wall of the block 1 so as to tap the passages 7 and 8 referred to (see Figures 2 and 3), and into the holes 11 metal pins 12, 12a, 12b and 12c are inserted to form contacts. The exterior of the pins have suitably rounded ends forming terminal contacts. The passage 9 may be formed by boring and the opening to the outer wall closed by a plug 9a.

The block 1 may be held in position upon a ceiling block 14 (see Figure 1), by a metal frame 15, or the like. Spring contacts 16 and 16a for the contacts 12b and 12c respectively are connected to terminal studs 17 and 17a fitted on to the ceiling block and connected by a strip 21 so that these terminals are common, while spring contacts 19 and 19a for the contacts 12 and 12a respectively are connected to other terminal studs 20 and 20a in the block 14.

Figures 2 and 6 show the mercury in the passages of the thermostat. It will be seen that in the normal equalised position of the mercury the contacts 12 and 12a are connected by the mercury and may thus close the lines of a normally closed circuit. Upon the heating of the air in the sensitive chamber 4, the mercury will be caused to move downwards in the passage 7 and rise in the passage 8 to contact 12b, and will thereby close a normally open circuit through the contacts 12 and 12b for the purpose of giving an alarm, and with the continued downward movement of the mercury in the passage 7 it will leave the contact 12a, thereby breaking the circuit between the contacts 12 and 12a, and this breaking of the closed circuit may also operate the alarm.

Should the sensitive chamber 4 become defective so that expansion of the air therein is not available to the mercury, for example, a leakage of air therefrom, then when the heat becomes sufficient to raise the temperature within the chamber 2, the pressure therefrom acting in the passage 8 will lower the mercury in the passage 8 and cause it to rise in the passage 7 until contact 12c is reached, and thereby complete the circuit between contacts 12 and 12c for giving an alarm, and if movement of mercury continues it will break the normally closed circuit between 12 and 12a and give a further alarm.

A passage 18 drilled in the block downwards from the chamber 2 and then to the exterior thereof is plugged with a fusible material 18a of low melting point, such as wax. Should the temperature in the vicinity of the thermostat gradually rise, as on a hot day, the air in both chambers will expand and no movement of the mercury will take place and the circuits are not affected, but should, for some reason, the temperature rise beyond a predetermined degree, as may be the case of a smouldering fire in the vicinity of the thermostat, then the fusible material will melt and the equilibrium of pressure between the chambers will be destroyed and the thermostat will function.

The sensitivity of the thermostat may be varied by the size or by the nature of the material of the cap 5.

What I claim is:

1. A thermostat comprising in combination, means providing two sealed air chambers, one of said chambers being readily sensitive to heat and the other chamber being less readily sensitive to heat, a supply of a conducting fluid arranged in a passage connecting said chambers so as to be movable therein in response to the air pressure in either chamber, conductors arranged to be engaged by the liquid, and fusible means forming a part of the seal of the chamber which is less readily sensitive to heat for releasing the pressure therein when the ambient temperature rises gradually above a predetermined value.

2. In a thermostat, a block of electrical insulating material having a sealed air chamber within a top portion thereof, a relatively thin cap member secured to the exterior of the bottom portion of the block providing a second sealed air chamber with the air therein more sensitive to a temperature increase than the air of the first chamber, said block having a passage therein extending downwardly from the first chamber and then upwardly and thereafter downwardly into communication with the second chamber, a supply of mercury retained within the passage by the first downwardly extending portion and the upwardly extending portion, and spaced conductors extending into the first downward extending portion and the upward extending portion of said passage so as to be engaged by the mercury.

VERE EDWARD HAMPSON-TINDALE.